United States Patent
Kaluzhny

(10) Patent No.: US 8,984,631 B2
(45) Date of Patent: Mar. 17, 2015

(54) PROCESSOR WITH DIFFERENTIAL POWER ANALYSIS ATTACK PROTECTION

(75) Inventor: Uri Kaluzhny, Ramat Beit Shemesh (IL)

(73) Assignee: Cisco Technology Inc., San Jose, CA (US)

( * ) Notice: Subject to any disclaimer, the term of this patent is extended or adjusted under 35 U.S.C. 154(b) by 235 days.

(21) Appl. No.: 13/521,541

(22) PCT Filed: Nov. 15, 2010

(86) PCT No.: PCT/IB2010/055158
§ 371 (c)(1),
(2), (4) Date: Oct. 31, 2012

(87) PCT Pub. No.: WO2011/141776
PCT Pub. Date: Nov. 17, 2011

(65) Prior Publication Data
US 2013/0054991 A1    Feb. 28, 2013

(30) Foreign Application Priority Data
May 12, 2010 (GB) .................................. 1007932.5

(51) Int. Cl.
*G06F 21/55* (2013.01)
*G06F 21/75* (2013.01)
(Continued)

(52) U.S. Cl.
CPC ............... *G06F 7/00* (2013.01); *G06F 21/558* (2013.01); *G06F 21/14* (2013.01); *G06F 21/75* (2013.01); *G06F 2207/7261* (2013.01)
USPC .............................................. 726/22; 726/26

(58) Field of Classification Search
CPC ... G06F 2207/7261; G06F 1/26; G06F 21/14; G06F 21/558; G06F 21/75; G06F 7/00
USPC ........................... 713/320, 22, 26; 726/22, 26
See application file for complete search history.

(56) References Cited

U.S. PATENT DOCUMENTS 6,298,442 B1    10/2001 Kocher et al.
6,415,365 B1 *  7/2002 Flynn ............................ 711/156
(Continued)

FOREIGN PATENT DOCUMENTS

WO    WO-2004/053683 A2    6/2004

OTHER PUBLICATIONS

International Search Report and Written Opinion issued in International Application No. PCT/IB2010/055158, mailed Mar. 24, 2011 (11 pages).

(Continued)

*Primary Examiner* — Thomas Lee
*Assistant Examiner* — Danny Chan
(74) *Attorney, Agent, or Firm* — Husch Blackwell LLP

(57) ABSTRACT

A device including a processor to perform an operation yielding a result, the processor including a register including bit storage elements and including a first and second section, each element being operative to store a bit value, and a power consumption mask module to determine whether the whole result can be completely written in half or less than half of the register, determine a balancing entry if the result can be completely written in half or less than half of the register, a write module to perform a single write operation to the register including writing the result and the balancing entry to the first and second section, respectively, if the result can be completely written in half or less than half of the register else writing the result of the operation across at least part of the first and second section. Related apparatus and methods are also described.

9 Claims, 1 Drawing Sheet

(51) Int. Cl.
*G06F 7/00* (2006.01)
*G06F 21/14* (2013.01)

(56) References Cited

U.S. PATENT DOCUMENTS

| 7,426,629 B2 * | 9/2008 | Piry et al. ............ 712/225 |
| 2005/0073346 A1 | 4/2005 | Elbe et al. |
| 2006/0125664 A1 | 6/2006 | Liardet et al. |
| 2007/0076864 A1 | 4/2007 | Hwang |
| 2007/0076890 A1 * | 4/2007 | Muresan et al. ......... 380/287 |
| 2008/0019503 A1 | 1/2008 | Dupaquis et al. |
| 2009/0010424 A1 | 1/2009 | Qi et al. |
| 2012/0254591 A1 * | 10/2012 | Hughes et al. ........... 712/205 |

OTHER PUBLICATIONS

Brier, Eric et al., "Correlation Power Analysis with a Leakage Model", Jul. 8, 2004, XP019009370 (14 pages).
DPA—Patent and Technology Licensing, www.cryptography.com/technology/dpa/licensing.html, Jun. 2010 (5 pages).
DPA Countermeasures, www.cryptography.com/resources/whitepapers/DPA.html, Jun. 2010 (2 pages).
Power Analysis, Wikipedia, http://en.wikipedia.org/wiki/Power_analysis, May 2009, (3 pages).

* cited by examiner

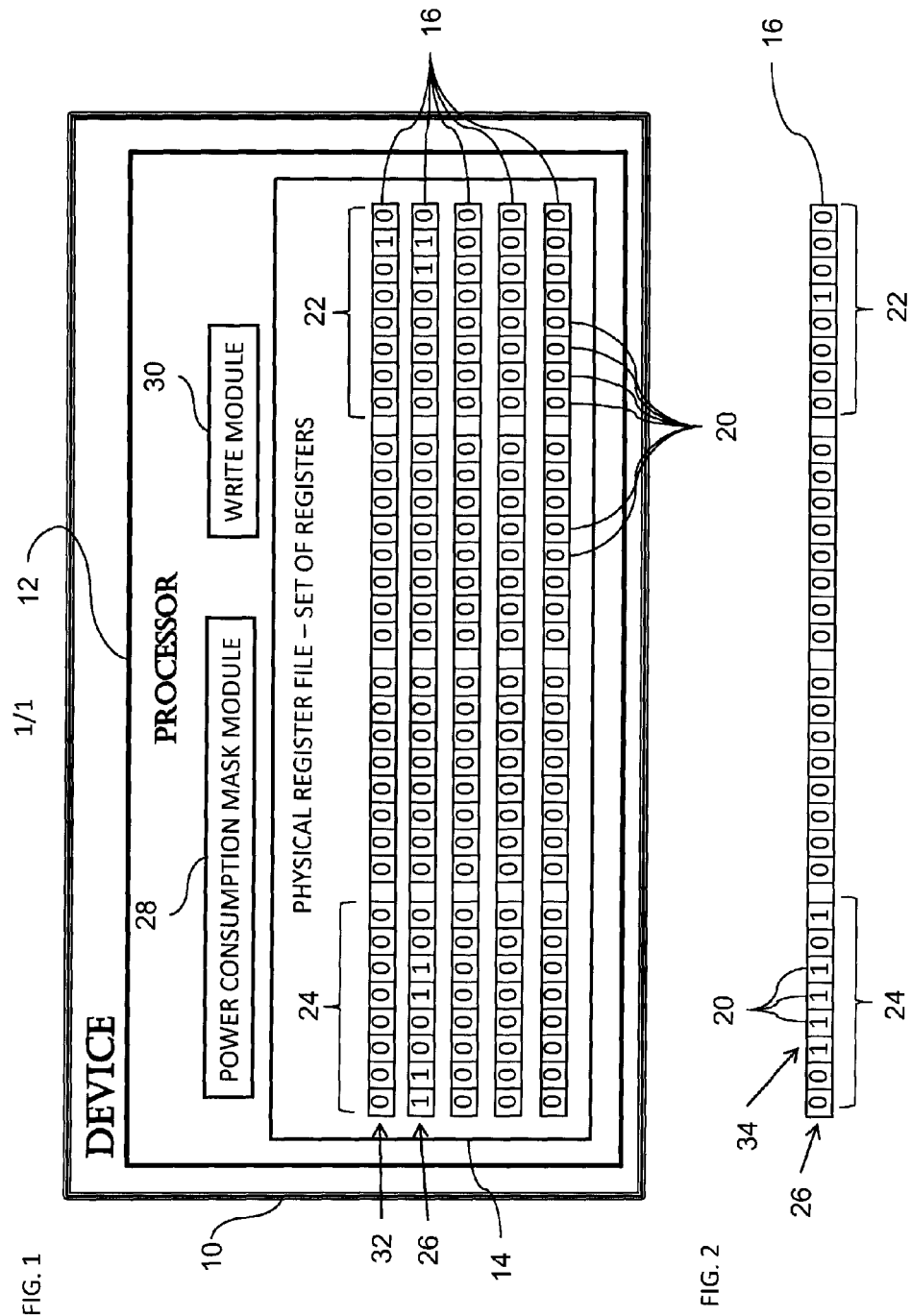

PROCESSOR WITH DIFFERENTIAL POWER ANALYSIS ATTACK PROTECTION

CROSS REFERENCE TO RELATED APPLICATIONS

The present application is a 35 USC §371 application of PCT/IB2010/055158, filed on Nov. 15, 2010 and entitled "PROCESSOR WITH DIFFERENTIAL POWER ANALYSIS ATTACK PROTECTION", which was published in the English language with International Publication Number WO 2011/141776 A1, and which claims the priority of Great Britain Patent Application No. GB 1007932.5 of NDS Limited, filed May 12, 2010, the content of all of which is incorporated herein by reference.

FIELD OF THE INVENTION

The present invention relates to a processor with differential power analysis attack protection.

BACKGROUND OF THE INVENTION

By way of introduction, Differential Power Analysis (DPA) includes a class of attacks against devices such as, smart cards and secure cryptographic tokens, by way of example only. DPA attacks typically exploit characteristic behavior of transistor logic gates and software running on smart cards and other cryptographic devices, by way of example only.

The DPA attacks are typically performed by monitoring the electrical activity of a device, then generally using statistical methods to determine secret information (such as secret keys and user PINs, by way of example only) in the device.

The following references are also believed to represent the state of the art:

U.S. Pat. No. 6,298,442 to Kocher, et al.;
US Published Patent Application 2005/0073346 of Elbe, et al.;
US Published Patent Application 2006/0125664 of Liardet, et al.;
US Published Patent Application 2007/053683 of Hwang;
US Published Patent Application 2008/0019503 of Dupaquis, et al.;
US Published Patent Application 2009/0010424 of Qi, et al.;
PCT Published Patent Application 2006/053683 of ARM Limited;
A book entitled "Power Analysis Attacks: Revealing the Secrets of Smart Cards" by Mangard, E. Oswald, and T. Popp, published by Springer 2007;
"Power Analysis" described by wikipedia.com;
An article entitled "DPA Countermeasures" posted at www.cryptography.com/resources/whitepapers/DPA.html; and
An article entitled "Licensed Countermeasures" posted at www.cryptography.com/technology/dpa/licensing.html.

SUMMARY OF THE INVENTION

The present invention, in certain embodiments thereof, seeks to provide an improved processor with differential power analysis attack protection and method of operation thereof.

There is thus provided in accordance with an embodiment of the present invention, a device including a processor operative to perform an operation, the operation yielding a result, the processor including a set of registers, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements, a power consumption mask module to determine whether (a) the whole result can be completely written in half, or less than half, of the one register or whether (b) the whole result needs to be written in more than half of the one register, and if the whole result can be completely written in half, or less than half, of the one register, determine a balancing entry to be written to the second section such that A plus B is equal to a predetermined masking number, wherein A is the number of the bit storage elements of the second section where the bit value will be changed due to writing the balancing entry to the second section, and B is the number of the bit storage elements of the first section where the bit value will be changed due to writing the result of the operation to the first section, and a write module to perform a first single write operation to the one register including (a) if the whole result can be completely written in half, or less than half, of the one register writing the result of the operation to the first section of the one register, and writing the balancing entry to the second section of the one register, so that the total number of the bit storage elements of the one register changed during the first single write operation is equal to the predetermined masking number, and (b) if the whole result needs to be written in more than half of the one register, writing the result of the operation across at least part of the first section and at least part of the second section of the one register.

Further in accordance with an embodiment of the present invention, each of the bit storage elements includes a flip-flop or a latch.

Still further in accordance with an embodiment of the present invention, the one register includes a plurality of least significant bits of the bit storage elements and a plurality of most significant bits of the bit storage elements, the least significant bits being included in the first section, the most significant bits being included in the second section.

Additionally in accordance with an embodiment of the present invention, the processor is operative to perform a second operation, the second operation yielding a second result, the power consumption mask module is operative to determine a second balancing entry to be written to the second section such that C plus D is equal to the predetermined masking number, wherein C is the number of the bit storage elements of the second section where the bit value will be changed due to writing the second balancing entry to the second section, and D is the number of the bit storage elements of the first section where the bit value will be changed due to writing the second result of the second operation to the first section, and the write module is operative to perform a second single write operation to the one register including writing the second result of the second operation to the first section of the one register, and writing the second balancing entry to the second section of the one register, so that the total number of the bit storage elements of the one register changed during the second single write operation is equal to the predetermined masking number.

Moreover in accordance with an embodiment of the present invention, the second single write operation is the next write operation performed on the one register after the first single write operation.

Further in accordance with an embodiment of the present invention, the processor is included in an integrated circuit.

Still further in accordance with an embodiment of the present invention, the set of registers is part of a physical register file, the one register being a physical register entry in the physical register file.

There is also provided in accordance with still another embodiment of the present invention, a method for updating a set of registers of a processor which is operative to perform an operation, the operation yielding a result, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements, the method including determining whether (a) the whole result can be completely written in half, or less than half, of the one register or whether (b) the whole result needs to be written in more than half of the one register, if the whole result can be completely written in half, or less than half, of the one register, determining a balancing entry to be written to the second section such that A plus B is equal to a predetermined masking number, wherein A is the number of the bit storage elements of the second section where the bit value will be changed due to writing the balancing entry to the second section, and B is the number of the bit storage elements of the first section where the bit value will be changed due to writing the result of the operation to the first section, and performing a single write operation to the one register including (a) if the whole result can be completely written in half, or less than half, of the one register writing the result of the operation to the first section of the one register, and writing the balancing entry to the second section of the one register, so that the total number of the bit storage elements of the one register changed during the single write operation is equal to the predetermined masking number, and (b) if the whole result needs to be written in more than half of the one register, writing the result of the operation across at least part of the first section and at least part of the second section of the one register.

There is also provided in accordance with still another embodiment of the present invention a device including means for registering a result of an operation, the means for registering including a plurality of registers, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements, means for determining whether (a) the whole result can be completely written in half, or less than half, of the one register or whether (b) the whole result needs to be written in more than half of the one register, means for determining a balancing entry to be written to the second section such that A plus B is equal to a predetermined masking number if the whole result can be completely written in half, or less than half, of the one register, wherein A is the number of the bit storage elements of the second section where the bit value will be changed due to writing the balancing entry to the second section, and B is the number of the bit storage elements of the first section where the bit value will be changed due to writing the result of the operation to the first section, and means for performing a single write operation to the one register including (a) if the whole result can be completely written in half, or less than half, of the one register writing the result of the operation to the first section of the one register, and writing the balancing entry to the second section of the one register, so that the total number of the bit storage elements of the one register changed during the single write operation is equal to the predetermined masking number, and (b) if the whole result needs to be written in more than half of the one register, writing the result of the operation across at least part of the first section and at least part of the second section of the one register.

BRIEF DESCRIPTION OF THE DRAWINGS

The present invention will be understood and appreciated more fully from the following detailed description, taken in conjunction with the drawings in which:

FIG. 1 is a partly pictorial, partly block diagram view of a device constructed and operative in accordance with an embodiment of the present invention; and FIG. 2 is a partly pictorial, partly block diagram view of a register of the device of FIG. 1 after being updated.

DETAILED DESCRIPTION OF AN EMBODIMENT

Reference is now made to FIG. 1, which is a partly pictorial, partly block diagram view of a device 10 constructed and operative in accordance with an embodiment of the present invention.

The device 10 typically includes a processor 12. The processor 12 may be a central processing unit (CPU) or any suitable processing unit, by way of example only. The processor 12 is generally operative to perform operations, typically logic operations. The logic operations are typically performed by an arithmetic logical unit (ALU) (not shown) of the processor 12. Each of the operations yields one or more results. The processor 12 is typically comprised in an integrated circuit (not shown).

The processor 12 typically includes a set 14 of registers 16. Each register 16 includes a group of bit storage elements 20. For the sake of clarity, only some of the bit storage elements 20 are labeled in FIG. 1 and FIG. 2. Each bit storage element 20 is typically operative to store a bit value of zero or one.

The set 14 of the registers 16 is typically part of a physical register file.

The instruction set architecture of the processor 12 typically defines the set 14 of the register 16 used to stage data between memory and the functional units of the processor 12. In simpler processors, the architectural registers typically correspond one-for-one to the entries in the physical register file within the processor 12. More complicated processors may use register renaming, so that the mapping of which physical entry stores a particular architectural register changes dynamically during execution. The register file is part of the architecture and visible to a programmer, as opposed to the concept of transparent caches.

Therefore, each register 16 is typically a physical register entry in the physical register file, even though the mapping of which physical entry stores the register 16 may change dynamically over time.

Each bit storage element 20 typically comprises a flip-flop or a latch, by way of example only. However, it will be appreciated by those ordinarily skilled in the art that the bit storage elements 20 may be implemented using any suitable element(s).

DPA attacks exploit the fact that data processing by an electronic device consumes power and the exact amount of the power consumed depends on the data being processed. Therefore, monitoring the power consumed by a device, for example, but not limited to, a cryptographic device, may lead to the discovery of secrets, for example, but not limited to, secret cryptographic keys.

Therefore, the device 10 aims to prevent DPA attacks by making the power consumption of the device 10 appear to be independent of the data being processed, particularly when writing data to the set 14 of the registers 16, as will be described below in more detail below.

By way of introduction, most of the power consumption during execution is used in changing the bit values of the bit storage elements 20 from zero to one or from one to zero and not in performing logical operations, by way of example only.

Additionally, most cryptographic operations (for example, but not limited to, operations using secret cryptographic keys), even with 32-bit CPU architecture by way of example only, are performed with 8 or 16 bits of data.

Therefore for some operations and/or operation types, in each register 8 or 16 of the 32 bits are used, by way of example only, and the remaining 16 or 24 bits, by way of example only, typically the most significant bits, usually remain unchanged and are treated as "useless data" or in most cases simply zeroed.

In other operations and/or operation types, more than half the register may be used (for example, 17 bits or more in a 32 bit register).

When half, or less than half, of the bits in a register are used, the device 10 makes use of the remaining unused bits in order to "hide" the power consumption used to change the bit values of the bit storage elements 20 from zero to one or from one to zero when writing a result of an operation to any one of the registers 16 by changing the "unused" bits as necessary.

Therefore, each register 16 has at least two sections including a first section 22 and a second section 24, the first section 22 being used to write the result of one of the operations and the second section 24 being used to hide the writing of the result with a balancing entry 34. When an operation has a result which uses more than half of the register 16, the result is typically written to at least part of the first section 22 and at least part of the second section 24. The first section typically includes some of the bit storage elements 20, for example, but not limited to, 8 or 16 of the bit storage elements 20. The second section 24 typically includes some of the bit storage elements 20, for example, but not limited to, 8 or 16 or 24, of the bit storage elements 20. By way of example only, the bit storage elements 20 of the first section 22 are the least significant bits of each register 16. By way of example only, the bit storage elements 20 of the second section 24 are the most significant bits of each register 16.

Reference is now made to FIG. 2, which is a partly pictorial, partly block diagram view of a register 26 of the device 10 of FIG. 1 after being updated. Reference is also made to FIG. 1. The register 26 is one of the registers 16.

The processor 12 includes a power consumption mask module 28 to determine whether the whole result of an operation can be completely written in half, or less than half, of the register 26 or whether the whole result needs to be written in more than half of the register 26.

If the whole result can be completely written in half, or less than half, of the register 26, the device 10 is operative such that when the result of the operation is written to the register 26, the total number of the bit values of the bit storage elements 20 changed (from zero to one or from one to zero) in the register 26 is equal to a predetermined masking number, so that the number of bits changed due to writing the result is hidden.

In particular, if the whole result can be completely written in half, or less than half, of the register 26, the power consumption mask module 28 is generally operative to determine the balancing entry 34 to be written to the second section 24 of the register 26 such that A plus B is equal to the predetermined masking number. A is the number of the bit storage elements 20 of the second section 24 of the register 26 where the bit value will be changed due to writing the balancing entry 34 to the second section 24 of the register 26. B is the number of the bit storage elements 20 of the first section 22 of the register 26 where the bit value will be changed due to writing the result of the operation to the first section 22 of the register 26.

The power consumption mask module 28 is typically part of the ALU of the processor 12.

The processor 12 also includes a write module 30 to write to the registers 16 by writing to each bit storage element 20 by either changing a one to a zero or a zero to a one, as necessary. The write module 30 is typically part of the ALU of the processor 12.

If the whole result can be completely written in half, or less than half, of the register 26, the write module 30 is typically operative to perform a single write operation to the register 26 including: writing the result of the operation to the first section 22 of the register 26; and writing the balancing entry 34 to the second section 24 of register 26, so that the total number of the bit values of the bit storage elements 20 of the register 26 changed during the single write operation is equal to the predetermined masking number.

The predetermined masking number may be fixed for all operations.

Alternatively, the predetermined masking number may change between each operation or periodically based on a certain pattern or in a random or pseudo-random pattern. It should be noted that the predetermined masking number is typically at least equal to the total number of bits that the result of the operation could have, so if the result is 8 bits then the predetermined masking number is also 8 bits.

If the whole result needs to be written in more than half of the register 26, the write module 30 is typically operative to write the result of the operation across at least part of the first section 22 and at least part of the second section 24 of the register 26.

In accordance with another embodiment of the present invention, the processor is operative to perform a second operation, the second operation yielding a second result. The power consumption mask module 28 is operative to determine whether the whole result of the second operation can be completely written in half, or less than half, of the register 26 or whether the whole result needs to be written in more than half of the register 26. If the whole result of the second operation can be completely written in half, or less than half, of the register 26, the power consumption mask module 28 is operative to determine a second balancing entry (not shown) to be written to the second section 24 such that C plus D is equal to the predetermined masking number. C is the number of the bit storage elements 20 of the second section 24 where the bit value will be changed due to writing the second balancing entry to the second section 24. D is the number of the bit storage elements 20 of the first section 22 where the bit value will be changed due to writing the second result of the second operation to the first section 22. If the whole result of the second operation can be completely written in half, or less than half, of the register 26, the write module 30 is operative to perform a second single write operation to the register 26 including: writing the second result of the second operation to the first section 22 of the register 26; and writing the second balancing entry to the second section 24 of the register 26, so that the total number of the bit values of the bit storage elements 20 of the register 26 changed during the second single write operation is equal to the predetermined masking number. If the whole result needs to be written in more than half of the register 26, the write module 30 is typically operative to write the result of the second operation across at least part of the first section 22 and at least part of the second section 24 of the register 26. Typically, the second single write operation is the next write operation performed on the register 26 after the previous single write operation described above.

The following describes a typical operation of the device 10 when a balancing entry is to be determined and written. The following notation is used in the description:

A(0-15) denotes the 16 least significant bits of register A, register A being one of the registers 16.

A(16-31) denotes the 16 most significant bits of register A.

B(0-15) denotes the 16 least significant bits of register B, register B being one of the registers 16.

The processor 12 performs an operation based on the data of A(0-15) and/or B(0-15). The result of the operation is to be written to A(0-15), now denoted as A-NEW(0-15).

The value of A(16-31), the balancing entry 34, also needs to be updated to ensure that the total number of bits changed in register A, during the write operation of the result to A(0-15), is equal to the predetermined masking number, say 16, by way of example only.

The new value of A(16-31), the balancing entry 34, may be determined as follows:

A(16-31) XNOR [A(0-15) XOR A-NEW(0-15)].

In accordance with another embodiment of the device 10, 8 bits are used for writing the result of an operation and 8 bits for "hiding" the writing of the result.

The registers 16 include the register 26 and another register 32. An operation is performed which performs addition on the 8 least significant bits of the register 26 and the register 32, with the result of the addition being written to the register 26.

By way of example, the initial value of the 8 least significant bits of the register 26 is equal to "00000110". The initial value of the 8 least significant bits of the register 32 is equal to "00000010".

Therefore, the addition of the initial values of the 8 least significant bits of the register 26 and the register 32 is equal to "00001000".

Therefore 3 bits will need to be changed in the 8 least significant bits of the register 26 in order to change the initial value of "00000110" to "00001000".

The predetermined masking number is fixed at 8, which is also the maximum number of bits that could be changed in the 8 least significant bits of the register 26. Therefore, 5 bits need to change in another unused part of the register 26 in order to "hide" the writing of the result.

The section chosen to "hide" the writing of the result is the section 24 of the register 26. The second section 24 includes the 8 most significant bits of the register 26, by way of example only.

The initial value, prior to writing the result, of the 8 most significant bits of the register 26 is equal to "11001100".

Therefore, in order to determine which 5 of the 8 most significant bits should be changed, and therefore the balancing entry 34, the following calculation is typically performed:

11001100" XNOR [00000110 XOR 00001000]

giving

11001100 XNOR 00001110, which equals

00111101.

Therefore, the 8 most significant bits (the second section 24) of the register 26 are changed from "11001100" to "00111101" which changes 5 of the bits as required.

Therefore, writing the result of "00001000" to the 8 least significant bits (the first section 22) and "00111101" to the 8 most significant bits (the second section 24) results in 8 bits being changed during the write operation to the register 26 thereby hiding the writing of the result of the addition operation.

It will be appreciated by those ordinarily skilled in the art that in the above description the second section 24 may include more than eight of the unused bit storage elements 20. Additionally, the predetermined masking number may be larger than 8, by way of example only.

The device 10 therefore provides the effect of hiding the writing of the result without needing two registers 16 or more to register a result.

In accordance with an alternative embodiment of the present invention, the power consumption mask module 28 is operative to determine a number E of the bit values of the bit storage elements 20 of the first section 22 of the register 26 that will be changed, from zero to one or from one to zero, by the result of the operation being written to the first section 22. The power consumption mask module 28 is also operative to determine a number F of the bit values of the bit storage elements 20 of the second section 24 that should be changed, from zero to one or from one to zero, so that E plus F is equal to the predetermined masking number. The write module 30 is operative perform a single write operation to the register 26 including: writing the result of the operation to the first section 22 of the register 26; and changing F of the bit values of the storage elements 20 of the second section 24 of the register 26 from zero to one or from one to zero, so that the total number of the bit values of the bit storage elements 20 of the register 26 changed during the single write operation is equal to the predetermined masking number. In addition to determining how many of the bit values of the bit storage element 20 of the second section 24 should be changed from one to zero or zero to one, the power consumption mask module 28 is operative to determine which bit storage elements 20 of the second section 24 of the register 26 should be changed from zero to one or from one to zero.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A device comprising a processor operative to perform an operation, the operation yielding a result, the processor including:

a set of registers, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements;

a power consumption mask module to: determine whether (a) the whole result can be completely written in half, or less than half, of the one register or whether (b) the whole result needs to be written in more than half of the one register; and if the whole result can be completely written in half, or less than half, of the one register, determine a balancing entry to be written to the second section such that A plus B is equal to a predetermined masking number, wherein:
- A is the number of the bit storage elements of the second section where the bit value will be changed due to writing the balancing entry to the second section; and
- B is the number of the bit storage elements of the first section where the bit value will be changed due to writing the result of the operation to the first section; and a write module to perform a first single write operation to the one register including:
- (a) if the whole result can be completely written in half, or less than half, of the one register: writing the result of the operation to the first section of the one register; and writing the balancing entry to the second section of the one register, so that the total number of the bit storage elements of the one register changed during the first single write operation is equal to the predetermined masking number; and
- (b) if the whole result needs to be written in more than half of the one register, writing the result of the operation across at least part of the first section and at least part of the second section of the one register.

2. The device according to claim 1, wherein each of the bit storage elements comprises a flip-flop or a latch.

3. The device according to claim 1, wherein the one register includes a plurality of least significant bits of the bit storage elements and a plurality of most significant bits of the bit storage elements, the least significant bits being comprised in the first section, the most significant bits being comprised in the second section.

4. The device according to claim 1, wherein:
the processor is operative to perform a second operation, the second operation yielding a second result,
the power consumption mask module is operative to determine a second balancing entry to be written to the second section such that C plus D is equal to the predetermined masking number, wherein:
- C is the number of the bit storage elements of the second section where the bit value will be changed due to writing the second balancing entry to the second section; and
- D is the number of the bit storage elements of the first section where the bit value will be changed due to writing the second result of the second operation to the first section; and the write module is operative to perform a second single write operation to the one register including: writing the second result of the second operation to the first section of the one register; and writing the second balancing entry to the second section of the one register, so that the total number of the bit storage elements of the one register changed during the second single write operation is equal to the predetermined masking number.

5. The device according to claim 4, wherein the second single write operation is the next write operation performed on the one register after the first single write operation.

6. The device according to claim 1, wherein the processor is comprised in an integrated circuit.

7. The device according to claim 1, wherein the set of registers is part of a physical register file, the one register being a physical register entry in the physical register file.

8. A method for updating a set of registers of a processor which is operative to perform an operation, the operation yielding a result, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements, the method comprising:
determining whether (a) the whole result can be completely written in half, or less than half, of the one register or whether (b) the whole result needs to be written in more than half of the one register;
if the whole result can be completely written in half, or less than half, of the one register, determining a balancing entry to be written to the second section such that A plus B is equal to a predetermined masking number, wherein:
- A is the number of the bit storage elements of the second section where the bit value will be changed due to writing the balancing entry to the second section; and
- B is the number of the bit storage elements of the first section where the bit value will be changed due to writing the result of the operation to the first section; and performing a single write operation to the one register including:
- (a) if the whole result can be completely written in half, or less than half, of the one register: writing the result of the operation to the first section of the one register; and writing the balancing entry to the second section of the one register, so that the total number of the bit storage elements of the one register changed during the single write operation is equal to the predetermined masking number; and
- (b) if the whole result needs to be written in more than half of the one register, writing the result of the operation across at least part of the first section and at least part of the second section of the one register.

9. A device comprising:
means for registering a result of an operation, the means for registering including a plurality of registers, each of the registers including a group of bit storage elements, each of the bit storage elements being operative to store a bit value of zero or one, one of the registers including a first section and a second section, the first section including a first plurality of the bit storage elements, the second section including a second plurality of the bit storage elements;
means for determining whether (a) the whole result can be completely written in half, or less than half, of the one register or whether (b) the whole result needs to be written in more than half of the one register;
means for determining a balancing entry to be written to the second section such that A plus B is equal to a predetermined masking number if the whole result can be completely written in half, or less than half, of the one register, wherein:
- A is the number of the bit storage elements of the second section where the bit value will be changed due to writing the balancing entry to the second section; and
- B is the number of the bit storage elements of the first section where the bit value will be changed due to writing the result of the operation to the first section; and means for performing a single write operation to the one register including:
- (a) if the whole result can be completely written in half, or less than half, of the one register: writing the result of the operation to the first section of the one register; and writing the balancing entry to the second section of the one register, so that the total number of the bit storage elements of the one register changed during the single write operation is equal to the predetermined masking number; and (b) if the whole result needs to be written in more than half of the one register, writing the result of the operation across at least part of the first section and at least part of the second section of the one register.

* * * * *